(12) United States Patent
Abraham

(10) Patent No.: US 7,725,075 B2
(45) Date of Patent: May 25, 2010

(54) CONTROL ELEMENT FOR SIMPLEX HF TO VHF/UHF CROSS-BAND SYSTEM WITH TRANSMISSION BREAKTHROUGH

(75) Inventor: Neil Abraham, Newton (AU)

(73) Assignee: Codan Limited, Newton, South Australia (AU)

( * ) Notice: Subject to any disclaimer, the term of this patent is extended or adjusted under 35 U.S.C. 154(b) by 502 days.

(21) Appl. No.: 11/888,967

(22) Filed: Aug. 3, 2007

(65) Prior Publication Data

US 2008/0032624 A1    Feb. 7, 2008

(30) Foreign Application Priority Data

Aug. 7, 2006    (AU) ............................... 2006904241

(51) Int. Cl.
*H04B 7/15* (2006.01)
(52) U.S. Cl. ........................... 455/11.1; 455/9; 455/15; 455/90.2
(58) Field of Classification Search ..................... 455/7, 455/9, 11.1, 13.2, 15, 24
See application file for complete search history.

(56) References Cited

U.S. PATENT DOCUMENTS

| | | | | |
|---|---|---|---|---|
| 4,539,706 A | * | 9/1985 | Mears et al. ................ | 455/11.1 |
| 5,109,526 A | * | 4/1992 | Reed ......................... | 455/11.1 |
| 5,163,158 A | * | 11/1992 | Tendler et al. ............. | 455/11.1 |
| 5,881,101 A | * | 3/1999 | Furman et al. ............. | 375/217 |
| 6,060,996 A | * | 5/2000 | Kaiser et al. ............... | 340/7.28 |
| 7,483,682 B2 | * | 1/2009 | Williams .................. | 455/180.1 |
| 7,577,457 B2 | * | 8/2009 | Karr et al. ................. | 455/550.1 |

* cited by examiner

*Primary Examiner*—Duc M Nguyen
(74) *Attorney, Agent, or Firm*—Klauber & Jackson LLC

(57) ABSTRACT

The device and method disclosed deals with the operation of a cross-band simplex radio frequency communications system. In a system having a first band receiver on a first radio frequency band for receiving and demodulating a first received signal, and a second band transmitter using a second radio frequency band to modulate and transmit the demodulated first received signal so as to communicate audio and signaling received by the receiver in one band to the transmitter of another band when in a cross band mode. There is also at least a second band receiver using the second radio frequency band typically associated with the second frequency band transmitter for receiving signals containing audio and signaling which is to be communicated to a first band transmitter so as to reply to the signal received on the first band receiver. A method of the invention disclosed includes the steps of: detecting the occurrence of a predetermined condition associated with the first received signal in the first band receiver; and replacing transmission of the demodulated signal received on the first band receiver with a breakthrough signal for a first predetermined time; ceasing transmission from the second band transmitter; and receiving on the second band receiver for a second predetermined time and determining if a signal is received on the second band receiver and if so allowing remote operation of the first band receiver of the single frequency simplex communications system.

6 Claims, 4 Drawing Sheets

CONTROL ELEMENT FOR SIMPLEX HF TO VHF/UHF CROSS-BAND SYSTEM WITH TRANSMISSION BREAKTHROUGH

RELATED APPLICATIONS

The present application claims priority from Australian Patent Application Serial No. 2006904241 filed on Aug. 7, 2006. Applicant claims priority under 35 U.S.C. §119 as to said Australian application, and the entire disclosure of that application is incorporated herein by reference.

FIELD OF THE INVENTION

This invention relates to the field of radio communications and in particular cross-band systems operating in simplex mode.

BACKGROUND

The High Frequency (HF) band is a unique medium for radio communications that is distinguished from most radio communication mediums by its point to point long distance and wide area capabilities using relatively simple modulation techniques, self contained transceivers and usable without repeaters. The communication distances of HF radio can be hundreds to thousands of kilometers making the medium suitable for vehicle based mobile transceivers located many kilometers from civilization that need to communicate between mobile transceivers or to base stations in less remote locations. The antennae of HF radio communication systems are long compared to most other radio communication systems which mean that mobile and base station platforms are possible but are not viable for handheld transceivers.

However, it is not always convenient to have to operate the HF transceiver from the mobile, especially, when the user works away from the vehicle.

In different radio frequency bands, for example, the Ultra High Frequency (UHF) range and Very High Frequency (VHF) range it is known to have both vehicle-mounted and hand-held transceivers that allow a user remote access to respective communication base station systems and that also may allow mobile-to-mobile or handheld-to-handheld communication between users. In general, the distance over which that is achievable for UHF and VHF transceivers is very small compared with HF vehicle based transceiver communications.

The mode of communication of HF, UHF and VHF systems can vary greatly. Some examples of those modes are:

Single Frequency Simplex (where each user shares a single frequency and takes turns speaking and listening);

Twin Frequency Simplex (where each user takes turns speaking and listening but transmit and receive on two different frequencies that allows the communication system to include a remotely located repeater so as to provide communications over a greater area than can be achieved transceiver to transceiver); for convenience reference herein to simplex systems will include both single and twin frequency simplex operation unless otherwise defined; and Twin Frequency Duplex (where each user can speak and listen at the same time and which also allows for the use of a repeater).

Very generally, single frequency simplex mode is used in HF communications; twin frequency simplex is used in land based mobile and handheld communications; and twin frequency duplex is used in cellular communications systems providing a more telephone like experience to the user. Cellular systems generally use radio frequency bands in the upper reaches of the UHF band.

Even with the use of UHF and VHF handheld transceivers, reliable communication distances are restricted to handheld to handheld maximum communication ranges when a repeater is not in range of the handheld. Often though, the user's vehicle based VHF or UHF transceiver is in range and with the greater range achievable with a vehicle based transceiver in the same or another band, it makes sense to provide a connection between the handheld and the vehicle based transceiver. This connection can be achieved a number of ways, each depending on the frequency band of either the handheld or the vehicle transceiver. It is generally easier in simplex systems where the handheld is in one or other of the VHF or UHF bands and the vehicle based transceiver is in the other.

The type of connection described immediately above is part of a cross-band system.

A simple example of a vehicle-mounted cross-band system is depicted in FIG. 1 (prior art) which shows a UHF handheld 10 being used remote of a vehicle 12 which has both a UHF transceiver 14 and VHF transceiver 16 that allows the user to communicate from their handheld via the vehicle to and from a VHF repeater 18 remote from the vehicle. Also depicted is another user 19 communicating in their turn via the VHF repeater 18 to the first mentioned UHF handheld 10.

In the example above, the communications mode is Twin Frequency Simplex and only one user can talk at a time via the remote repeater.

However, in a Single Frequency Simplex system such as one using the HF band, if an HF remote base station is used to communicate over distances to a vehicle mounted HF receiver but the HF receiver receives both the HF transmitted signal and an interference signal, such as a strong Amplitude Modulated commercial radio station, there is a likelihood that a strong enough interfering signal will swamp the vehicle-mounted HF receiver and the signal from the base station will be lost in the noise or made intelligible.

However, furthermore such an occurrence will also adversely affect the operation of a cross-band system designed to pass on the received HF signal to the user of a handheld transceiver, because the unwanted received signal will cause the connected VHF or UHF transmitter to transmit to the handheld radio, for as long as the received signal includes that noise and/or an unintelligible voice signal. Yet further the calling party using the HF link will not be aware of this problem.

Thus use of a single frequency simplex system excludes a single frequency simplex remote handheld (operating in the VHF or UHF bands) doing anything other than receiving unwanted transmitted noise or otherwise intelligible voice signal because the handheld does not have the ability to access the cross-band system to advise the originator of the signal that they can not be heard. This is the case because the respective VHF or UHF receiver at the mobile is blocked from being received while the respective VHF or UHF transmitter in the vehicle is retransmitting the interfering signal received on the HF receiver.

Furthermore the HF receiver is not controllable by the HF remote base station since the HF receiver is swamped or adversely affected by the interfering signal.

For this type of problem, the invention described herein eliminates, reduces or at least provides an alternative operation for a simplex cross-band system.

BRIEF DESCRIPTION OF THE INVENTION

In a broad aspect of the invention is a method of operation of a cross-band simplex radio frequency communications system including, a first band receiver on a first radio frequency band for receiving and demodulating a first received signal, a second band transmitter using a second radio frequency band to modulate and transmit the demodulated first received signal when in a cross band mode, and a second band receiver using the second radio frequency band, the method including the steps of:

detecting the occurrence of a predetermined condition associated with the first received signal in the first band receiver; and replacing transmission of the demodulated signal received on the first band receiver with a breakthrough signal for a first predetermined time;

ceasing transmission from the second band transmitter; and receiving on the second band receiver for a second predetermined time and determining if a signal is received on the second band receiver and if so allowing remote operation of the first band receiver of the single frequency simplex communications system.

In a further broad aspect of the invention is a control element for a cross-band simplex radio frequency communications system, the system including, a first receiver on a first radio frequency band for receiving and demodulating a first received signal, a transmitter using a second radio frequency band to modulate and transmit the demodulated first received signal, and a second radio frequency receiver using the second radio frequency band, the control element including;

a detection arrangement for detecting the occurrence of a predetermined failure condition associated with the demodulated first received signal;

a control arrangement triggered by the detection arrangement for replacing transmission of the first demodulated received signal with a breakthrough signal for a first predetermined time; and receiving on the second radio frequency receiver for a second predetermined time and determining if a signal is received on the second radio frequency receiver and then allowing the further operation of the cross-band single frequency simplex communications system.

Any reference to the prior art contained herein is not to be taken as an admission that the information is common general knowledge.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Specific embodiments of the invention will now be described in some further detail with reference to and as illustrated in the accompanying figures. These embodiments are illustrative, and are not meant to be restrictive of the scope of the invention. Suggestions and descriptions of other embodiments may be included within the scope of the invention, but they may not be illustrated in the accompanying figures. Alternatively features of the invention may be shown in the figures but not described in the specification.

DETAILED DESCRIPTION OF EMBODIMENTS OF THE INVENTION

The invention can be practiced in a variety of ways by performing methods and/or providing means to perform the function of a cross-band system according to the invention.

In an embodiment of the invention, both an HF transceiver and the VHF or UHF transceiver are vehicle-mounted and are coupled so as to allow signals received by one of them to be transmitted by the other.

In regards to the embodiment described when the terms VHF or UHF are used, it should be understood that the designated transceiver operates in either of those bands but not both.

Furthermore, in this embodiment reference is made to different frequency bands namely the HF, VHF and UHF bands and to generalise those bands reference is also made to first and second bands in the context of receivers and transmitters that operate in different bands.

It should however be understood that the names of the bands (e.g. HF, VHF and UHF) is indicative only and although understood to refer to agreed radio frequencies within the total spectrum of radio frequencies, it is also possible for the term band to refer to a spread of frequencies within the radio frequency spectrum that may fall within a known band such as the HF, VHF and UHF bands and furthermore for two bands to fall within the same known band such as the HF, VHF and UHF bands.

In the embodiment described herein signals modulated onto a HF transmission that are received at the mobile from a distant HF transceiver are first received by an HF receiver in the HF transceiver and demodulated by the receiver. The demodulated signal is typically an audio signal but other signals such as control signals can be demodulated from the transmitted signal. The cross-patch system transfers all or a portion of the demodulated version of the received signal to the vehicle-mounted VHF or UHF transmitter of the VHF or UHF transceiver which is then modulated and transmitted by the transmitter and then received by a handheld radio device operating on a corresponding VHF or UHF transceiver which is held by a user located remote of the vehicle. Handheld is a common term for such a transceiver but because of the many variations of personal radio configurations the transceiver may not actually be held in the hand of the user. Wired and wireless microphones and remote press-to-talk configurations are possible such that the transceiver is merely worn by the user.

In such an arrangement, return signals are sent from the handheld VHF or UHF transceiver via the vehicle-mounted VHF or UHF transceiver and vehicle mounted HF transmitter to the distant HF transceiver and beyond.

In this embodiment the HF and VHF/UHF transceivers in the vehicle operate in simplex mode, meaning that they can only either transmit or receive at any one time.

This specification describes by way of example a number of ways of implementing cross-patch functionality and the ways in which such a cross-band system can be used.

Figure 1:
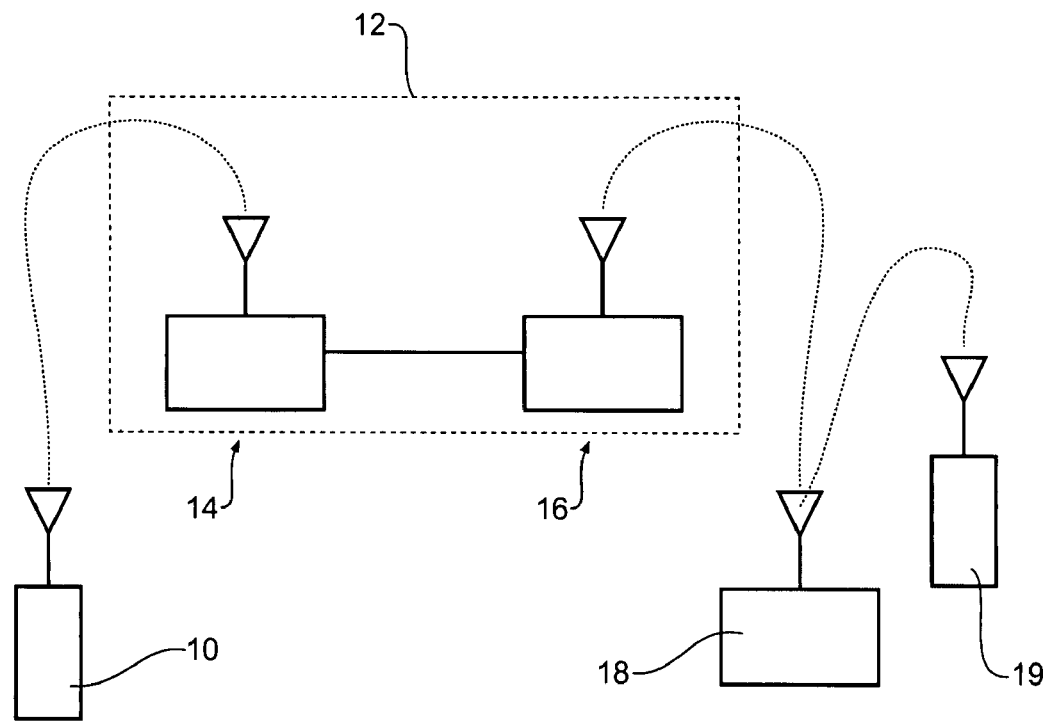
FIG. 1 depicts a prior art twin frequency simplex cross-band system using a UHF handheld and VHF mobile transceiver having a separate control circuit connected to both a UHF transceiver and VHF transceiver located in the vehicle.
Figure 2:
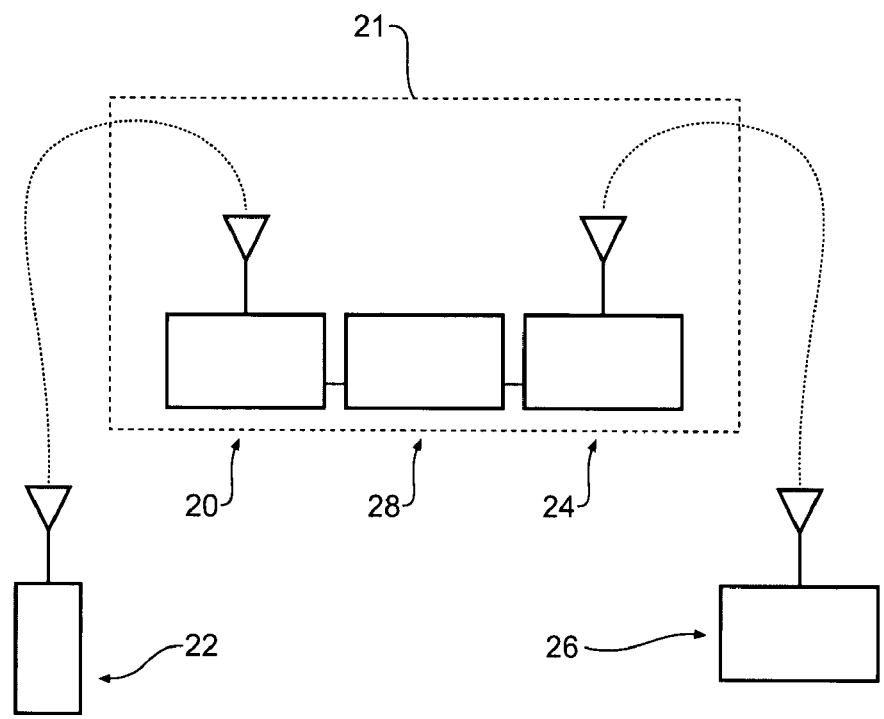
FIG. 2 depicts an embodiment of a cross-band system using one UHF handheld and separate cross-band control circuit connected to both a UHF transceiver and HF transceiver located in a vehicle.

FIG. 2 depicts a simple block diagram of the elements of a single frequency simplex cross-band system according to the embodiment described herein.

An element of the radio equipment configuration in the vehicle 21 is a UHF transceiver 20 (UHF Tx/Rx) that operates in Twin Frequency Simplex Mode. The UHF transceiver transmits on a different frequency to that which it receives. When the UHF handheld 22 which also operates in Twin Frequency Simplex mode communicates with the UHF vehicle-mounted transceiver, it is not possible for the transmitting handheld to be received by the vehicle-mounted UHF receiver while the vehicle-mounted UHF transmitter is being controlled to transmit by the vehicle-mounted HF transceiver.

Another element of the vehicle-mounted radio equipment configuration is the HF transceiver 24, which operates in a Single Frequency Simplex mode.

When the HF transceiver receives a signal (audio and possibly signalling) from a remote HF transceiver 26, the aim of a cross-band system is to communicate that signal to the UHF handheld via the vehicle-mounted UHF transmitter. However, as described previously, when the vehicle-mounted HF receiver is swamped by a spurious signal or otherwise receives an interference signal, it will communicate that signal to the handheld via the vehicle-mounted UHF transmitter even though it is of no value to the handheld user and causes a nuisance to the user.

A number of embodiments will be described and FIG. 2 is a diagrammatic representation because the HF cross-patch circuit 28 could be separately mounted from the transceivers 20 and 24 and connected wirelessly or by cable to respective VHF/UHF and HF transceivers, or it can be incorporated into either or both of the VHF/UHF and HF transceivers with wired or wireless connection to the other of the transceivers. FIG. 2 shows a separate enclosure 28 connected by wires to the respective transceivers.

In all the embodiments there is provided a HF cross-patch circuit 28 that monitors the communication between the vehicle-mounted HF transceiver 24 and the vehicle-mounted UHF transceiver 20. When there is detection of signals received by either of them the cross-patch circuit works to communicate the received signal to the other of the transceivers.

However, if the HF cross-patch circuit detects the occurrence of a predetermined failure condition associated with the signal received by any of the receivers but in particular the HF receiver, the HF cross-patch circuit is arranged to deal with such an occurrence to ensure that the system operates to the advantage of all users. In particular, a capability is provided for the handheld user to be able to initiate contact via the cross-band system if they are in trouble or need other assistance.

In one embodiment, the cross-patch circuit is adapted to detect that a spurious (unwanted) signal is being received via one of the transceivers. In most situations, it will be the HF receiver of the HF transceiver that receives a strong signal that is not from a remote HF transceiver. For example, such a signal could be high power amplitude modulated commercial radio station transmission, or a strong navigation beacon radio transmission, etc. In such a circumstance unwanted noise, signal interference or voice distortion associated with this unwanted transmission is being repeated and sent to the handheld transceiver.

A characteristic of the demodulated signal that can be used to determine unwanted or spurious signal intrusion is the noise level of the demodulated signal. Another characteristic that indicates unwanted or spurious signal intrusion or a signal that affects the received signal is the level of noise in the received signal. A yet further characteristic that is indicative of unwanted or spurious signal intrusion is the detection of 50 Hz modulation or harmonics thereof in the demodulated signal, or for any unusual level of harmonically related signal other than expected signaling.

If an occurrence is determined to be the detection of a predetermined "failure" condition within a predetermined time, that time being such that voice communication is unduly interrupted or made intelligible or signaling errors occur, the cross-patch circuit will be programmed accordingly. The actual level or levels of one or more characteristics to be deemed a failure condition is a matter of experiment and may vary for different radio frequency bands of operation, environment and equipment quality and taken into consideration with one or more or other features over various times.

Once the predetermined condition has been determined to have occurred the cross-patch circuit will generate a tone, referred to herein as a "breakthrough tone" or "tones".

The breakthrough tone is communicated to the UHF transmitter. Then the tone is transmitted to the handheld UHF receiver so the handheld operator knows that the cross-patch circuit is functioning to allow them to then break through the HF signal that has been sent to their handheld transceiver after a further function or functions are performed by the cross-patch circuit.

After a period of, for example in this embodiment, two seconds, the transmitter of the vehicle-mounted UHF transceiver is switched "off". One way of doing this is to open circuit (release) the Press-To-Talk (PTT) control line of the vehicle-mounted VHF/UHF transmitter. The PTT line is one of the controls used by the HF cross-patch circuit to synchronize the communication of the vehicle-mounted HF receiver with the vehicle-mounted UHF transmitter, which need to work in unison while there is a signal being received by the vehicle-mounted HF receiver from a remote HF transceiver or other source.

With the vehicle-mounted UHF transmitter "off", the UHF receiver is available (since the UHF transceiver is working in simplex mode) to receive a transmission from the handheld transceiver.

In an embodiment, the cross-patch circuit monitors the squelch circuit of the vehicle-mounted UHF receiver by detecting the active squelch condition. The UHF squelch line is one of the controls used by the HF cross-patch circuit to synchronize the communication of the vehicle-mounted UHF transceiver with the vehicle-mounted HF transceiver, which need to work in unison while there is a signal being received by the vehicle-mounted UHF receiver from a remote UHF transceiver, such as the handheld UHF transceiver radio.

The handheld radio user, having heard the breakthrough tone/s described previously, may decide to breakthrough the HF noise they have been listening to or control an aspect of the HF transceiver, such as change channel, mute the HF receiver or adjust its squelch level. To do so, and in one embodiment, they press and hold the PTT of the handheld transceiver radio for a predetermined period of time shortly after hearing the breakthrough tone. The operation of the PTT of the handheld transmitter generates a transmission from the handheld radio which is received by the cross-patch circuit via the corresponding vehicle mounted receiver and indicates to the cross-patch circuit that the handheld radio user wishes to send a message via the HF transceiver or tones or other signals to remotely control the operation of the vehicle mounted HF transceiver.

The ability to remotely control the HF transceiver is a feature dependent largely on the model of the HF transceiver, as not all vehicle-mounted HF transceivers will have a remote control capability.

Dual Tone Multi-Frequency (DTMF) tones are most often used in radio communication equipment to communicate a range of control commands to a remote device, such as in this example the vehicle-mounted HF transceiver.

DTMF tones may also require pre and post selective call signaling tones that may be required so as to restrict access and control to the vehicle-mounted equipment and remote repeater and base stations.

DTMF tones and selective call tones can also be used to control the operation of the cross-patch circuit.

By way of example, if an active call is taking place, that is, when the handheld radio user is receiving a relayed communications from a remote HF user and the handheld radio user needs or want to terminate the active call, they need to breakthrough the repeater function that is being performed during the active call. Without the operation of the cross-patch breakthrough functionality, they cannot just press the PTT on the handheld transceiver and enter a predetermined DTMF sequence to hang-up or cease the HF call or make any remote adjustments to the HF transceiver.

However, during the previously described cease in transmission from the UHF transceiver, the cross-patch circuit can receive a DTMF sequence to make the HF transceiver perform a predetermined one or a predetermined series of commands.

By way of example, the first step in a predetermined series is to generate a "confirmation" tone and send it to the handheld radio user.

The next step although it may be in parallel with the first step, effectively terminates the active call.

This is achieved at a control level if allowed by the particular HF transceiver or by directly controlling the Press-To-Talk (PTT) control line of the UHF transceiver and the receiver squelch (mute) lines of the HF transceiver.

Once the HF transceiver is in the desired condition, the cross-patch circuit receives by any suitable means a signal confirmation of that condition. In the absence of any explicit commands sent by the handheld user, the cross-patch circuit will command the HF transceiver to enter a receiving mode, typically a radio HF frequency-scanning mode across the available HF frequencies. Predetermined audible signals indicative of the effect of an earlier sent DTMF tone has had on the first band receiver and/or transmitter can be signaled.

So that the handheld radio user knows that the HF transceiver is in that condition the cross-patch circuit transmits for a period, for by example two seconds, using the vehicle-mounted UHF transmitter. The transmission is of HF received noise, which is indicative to the handheld radio user that the HF-transceiver is operational.

If the handheld radio does not have DTMF capability, the cross-patch circuit could be configured to recognize a series of PTT operations sent by the handheld radio by its operator. However, it is also possible for the HF transceiver to use its own operational protocols to determine the cessation of an active call and resume normal operation as described after a predetermined time.

The type and specification for tones to be used by the cross-patch circuit include those depicted in Table 1. These tones could be sub-audible and/or audible.

| | | Tones generated by Crosspatch | | | |
|---|---|---|---|---|---|
| Function | Name | Tone1 | Tone2 | Tone3 | Tone4 |
| Active Mode | Low-High | 750 Hz 100 ms | 25 ms delay | 1200 Hz 100 ms | |
| Standby Mode | High-Low | 1200 Hz 100 ms | 25 ms delay | 750 Hz 100 ms | |
| Scan On | Rising | 460 Hz 100 ms | 750 Hz 100 ms | 1200 Hz 100 ms | 1500 Hz 100 ms |
| Scan Off | Falling | 1500 Hz 100 ms | 1200 Hz 100 ms | 750 Hz 100 ms | 460 Hz 100 ms |
| Channel Set | High-High | 1200 Hz 50 ms | 100 ms delay | 1200 Hz 50 ms | |
| Error | Error | 460 Hz 250 ms | | | |
| End of VHF/UHF audio | High | 1200 Hz 50 ms | | | |
| Confirmation | High-High | 1200 Hz 100 ms | | 1200 Hz 100 ms | |
| Breakthrough | Pip | 1200 Hz 50 ms | | | |
| Call Failed | Error | 460 Hz 250 ms | | | |
| Call Success (Incoming Call) | Ring-Ring | ring tones produced by appropriate delay between rings | | | |
| Tuning Pips | Pip-Pip | 740 Hz | 150 ms | 740 Hz | |

-continued

Tones generated by Crosspatch

| Function | Name | Tone1 | Tone2 | Tone3 | Tone4 |
|---|---|---|---|---|---|
| Missed Call Pips | Pip | 150 ms | delay | 150 ms | |
| | | missed call pips produced by large delay between pips | | | |

In an embodiment, the cross-patch circuit is set to accept DTMF numerical digit sequences if the lengths of those sequences are in accord with the following rules:

Channels Designations are two digits long; Address lookup calls must be two digits long; Selective call's and Phone call's station address only, must be between 3 and 15 digits long; and Phone call (telephone numbers) must be between 1 and 16 digits long.

In a situation where the VHF/UHF handheld transceiver is not equipped with DTMF capability then the following commands can be used by manipulation of the PTT of the handheld:

Holding the PTT for three seconds minimum is a command to the HF transceiver to stop scanning and select the last user selected channel; and Pressing the PTT briefly three times within a maximum of three seconds where each PTT is say between 0.25 and 0.75 seconds in length generates a command to the HF transceiver for which the transceiver's resultant actions are pre-configured.

Figure 3:
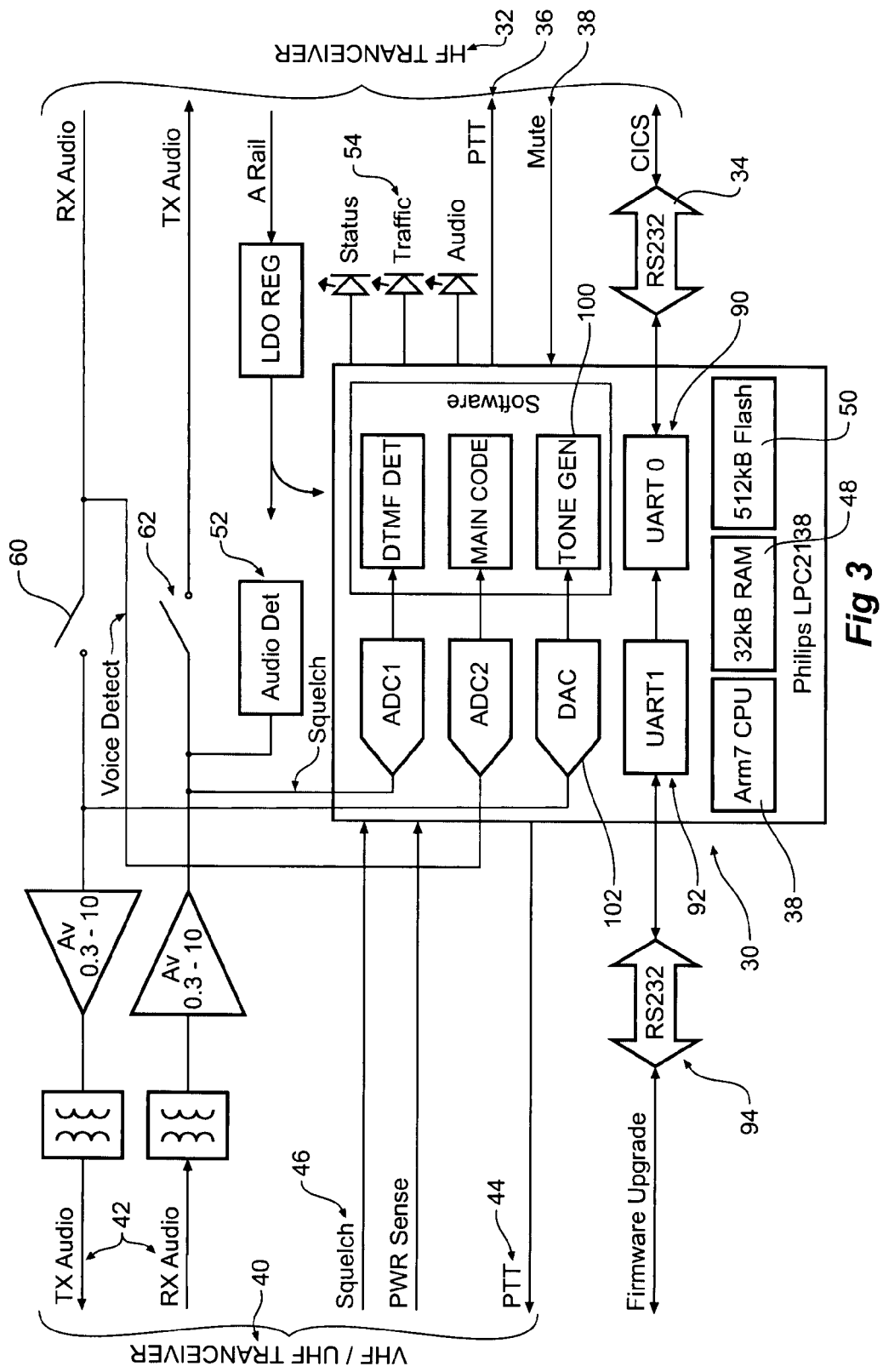
FIG. 3 depicts an embodiment of a control circuit for providing a HF to VHF/UHF cross-band function.

FIG. 3 depicts a functional block diagram of an embodiment of the cross-patch circuit. The actual integrated circuit chips and ancillary discrete components of the circuit are not shown. Likewise, the program (software/firmware) that performs the functionality described above and elsewhere in this specification is not detailed in this specification as persons or a team skilled in the art will be capable of providing those details based on the description of the circuit and the functionality provided herein.

The cross-patch circuit is an adaptive interface device that provides a communication path between HF and VHF/UHF transceivers.

The operation of the cross-patch circuit is controlled by a 32 bit ARM microcontroller 30 within a Philips LPC2138 from the Philips ARM LPC microcontroller family. The microcontroller communicates with the attached HF transceiver 32 (not shown) using one of the two on-chip UARTs via RS232 serial commands using an RS232 port 34, PTT and MUTE control signals 36 and 38 respectively. The attached VHF/UHF transceiver 40 (not shown) is interfaced using bi-directional audio 42, PTT 44 and SQUELCH 46 control signals.

The cross-patch circuit includes a power conditioning and distribution circuitry (not shown but described below), digital memory 48 and 50 to store the operating program and variable data used by the cross-patch circuit, audio signal detection circuit 52, and status, traffic and audio detecting indicators 54.

Power Supply

DC Power for the cross-patch circuit is obtained in this embodiment from the HF Transceiver's protected supply rail. The received direct current power passes through a linear voltage regulator to provide (A Rail) a 3.3V supply rail for distribution within the cross-patch circuit, for example powering the microcontroller 30 and other circuitry of the cross-patch circuit.

Audio Paths

Analogue Rx audio from the HF transceiver passes through an electronic switch 60 and into a mixer stage, which combines this signal with the Microcontroller's DAC output 102. The mixed signal passes through a variable gain amplifier, before being transformer coupled and presented at the VHF/UHF transceivers transmit audio input.

Analogue Rx audio from the VHF transceiver passes through a coupling transformer and a variable gain amplifier stage. This signal is split and band-limited before passing into the Microcontroller's internal ADC. The signal also passes via an electronic switch 62 to the HF transceivers transmit audio input.

The electronic audio path switches work in unison as required and are controlled by the microcontroller 58.

Microcontroller

A 32 bit RISC microcontroller 58 is responsible for the operation of the cross-patch circuit. The microcontroller 58 is clocked from an external 14.7456 MHz crystal (not shown), which is internally multiplied by four, resulting in a core clock frequency of approximately 59 MHz and use of an on-chip Phase Lock Loop circuit (not shown).

Digital input signals to the microcontroller include configuration DIP switches (not shown), the VHF/UHF SQUELCH signal 46, and an HF MUTE signal 38. Digital output signals from the microcontroller are used by the indicator LEDs 54 for status, traffic and audio, VHF/UHF transceiver PTT 44 and HF transceiver PTT 36 controls, and the analogue audio path switches 60 and 62.

The microcontroller also incorporates an ADC and a DAC. The ADC is used to process VHF/UHF receive audio, for the detection of DTMF commands. The DAC is used to generate predetermined audible signals including synthesized status tones or synthesized voice announcements, which are sent to the VHF/UHF transceiver. Pre-stored audio signals including voice messages can also be used.

The microcontroller has two serial ports, one 90 of which is used to provide serial control commands to the attached HF transceiver 34, via an RS232 interface device the other 92 is used to receive 94 firmware updates for the cross-patch processor and communicate external of the cross-patch device setup values, etc.

Microcontroller Firmware

The microcontroller contains 512 kB of internal FLASH memory 50, which stores the cross-patch circuit firmware.

Some aspects of the firmware operation follow:

At start-up, the configuration DIP switches (not shown) are read. The firmware code can then execute one or more test modes, or commence normal execution, at which point the attached HF transceiver is queried for its current operating mode. The behavior of the cross-patch circuit is then dependent on the current operating mode.

In "Off" mode, the only function of the cross-patch circuit is to monitor the HF transceiver command interface for messages indicating mode changes. No audio patching occurs.

In "Standby" mode, the cross-patch circuit also monitors the HF transceiver command interface for incoming calls to the HF transceiver. Any incoming call messages will trigger the cross-patch circuit to generate a ringing tone that is transmitted on the VHF/UHF transmitter. If the cross-patch circuit detects a response via the Squelch Input from the VHF/UHF network, this is accepted by the cross-patch circuit as an acknowledgement to the ringing tone sent. Audio received on the HF receiver is then patched 60 to the VHF/UHF transmitter for the duration of the call. The microcontroller also monitors the VHF/UHF receive audio for the Active State DTMF command.

In "Active" mode, the cross-patch circuit monitors the HF transceiver's state via the command interface. If the HF transceiver is on-channel (i.e. not scanning) or has received a call, any detected audio is patched to 60 and from 62 the VHF/UHF transceiver.

The microcontroller also monitors the VHF/UHF receive audio for any of the available DTMF commands, for example Channel Select, Scan On or Place Call. These commands are decoded and sent to the HF transceiver via the command interface. The cross-patch circuit signals the progress of these commands to the VHF/UHF transceiver using synthesised tones generated or replayed from storage 100, for example a successful Channel Select command will result in a "high-high" tone being sent from the vehicle-mounted VHF/UHF transmitter to the handheld transceiver via DAC 102.

Figure 4:
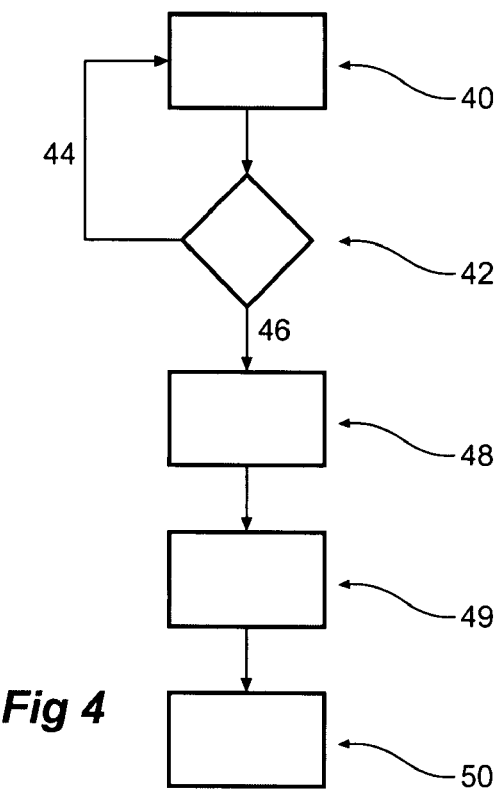
FIG. 4 depicts a flow diagram of the method of an embodiment of the breakthrough function of a single frequency simplex cross-band system.

FIG. 4 is a flow diagram of an embodiment of the breakthrough function performed by the cross-patch circuit.

In the "Active" mode 40, as described above, the cross-patch circuit is passing received audio from the HF receiver (receiving on a first frequency band) to the VHF/UHF transmitter (transmitting on a second frequency band), as well as monitoring for and detecting 42 the occurrence of a predetermined failure condition associated with a received signal from the HF transceiver. If no failure condition is detected 44 the passage of audio continues 40.

Once a failure condition is detected 46, the cross-patch circuit replaces 48 transmission of the received signal with a breakthrough signal for a first predetermined time.

Soon thereafter or simultaneously, the UHF transmitter is ceased 49 and the UHF receiver (the second radio frequency receiver), receives for a second predetermined time to determine if a signal is received on the second radio frequency receiver allowing the further operation of the cross-band single frequency simplex communications system 50.

Any of the predetermined time periods are set by the firmware or software code based on experimental data but they may be determined dynamically taking transmission frequencies, operational circumstances, and other issues into the determination process.

Figure 5:
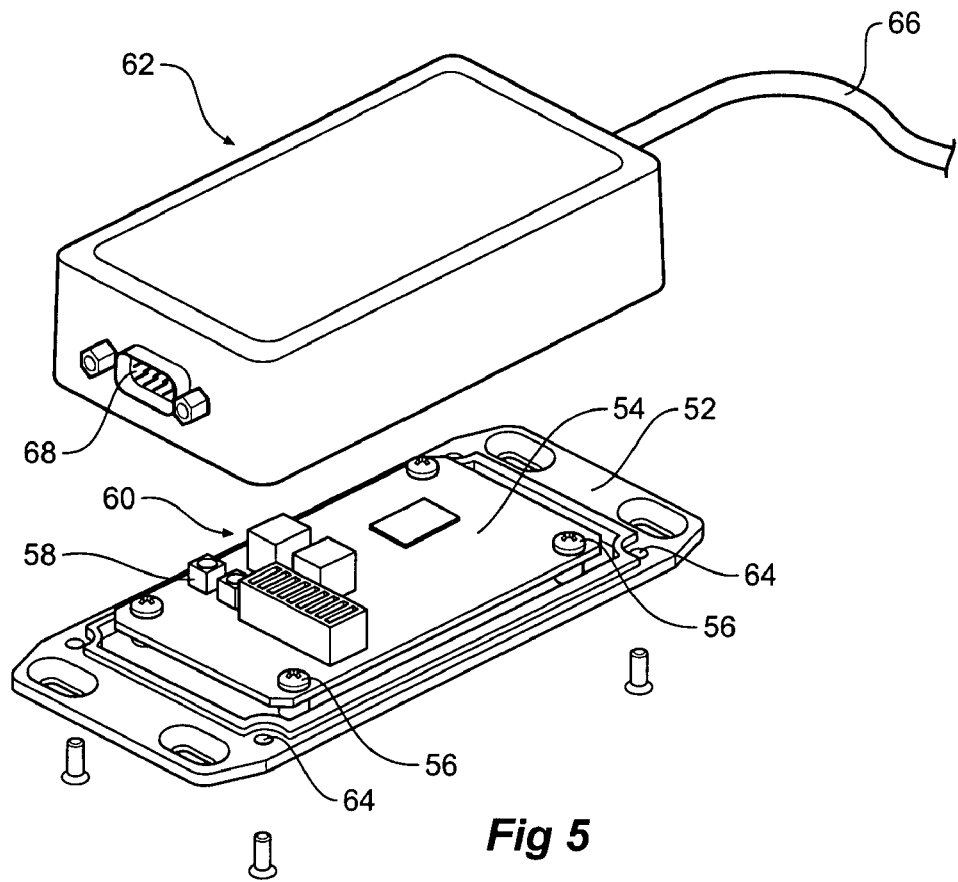
FIG. 5 depicts an example of the outer casing of a cross-band system circuit.

FIG. 5 depicts the outer casing 62 of a cross-band system control circuit according to the invention that is disclosed herein. The base 52 is formed from moulded plastic and sized to fit the cross-patch circuit board 54 flat against its upper surface. The circuit board is fixed with screws 56 to the base. Various circuit elements 58 and 60 by way of example are shown pictorially on the upper surface of the circuit board 54. The cover 62 is shown located above the base and circuit board, which can be attached to the base with one or more screws (not shown) that are placed through holes 64 (not all numbered) in the base and into the base of the cover. Signals are conducted from the cross-band system circuit to the HF and VHF/UHF transceivers by cable (one of which is depicted 66 that connects to the VHF/UHF transceiver). The second cable between the cross-band system and the HF transceiver is connectable to the cross-band system at the D-type connector 68 and connection of the rear of the D-type connector to the circuit board is by a wire loom (not shown).

Figure 6:
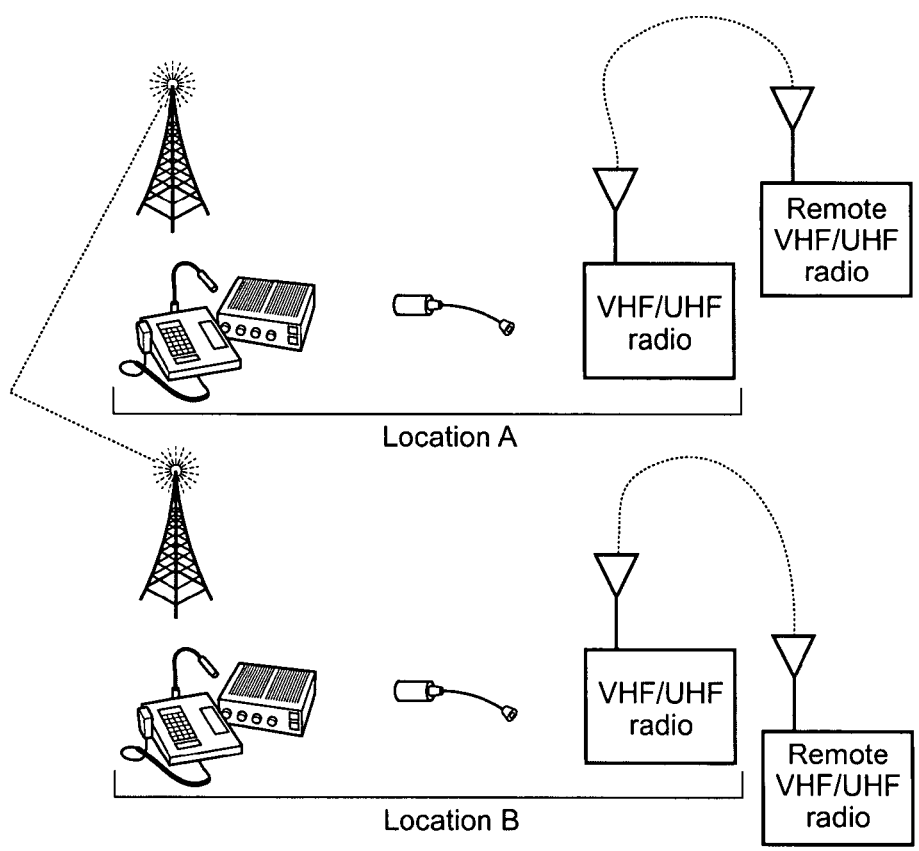
FIG. 6 depicts a VHF/UHF handheld radio to VHF/UHF handheld radio communication via two vehicle-mounted or even base station HF transceivers.

FIG. 6 depicts a VHF or UHF (VHF/UHF) handheld radio to VHF/UHF handheld radio communication via two land-based [HF to VHF/UHF) cross-band systems. The VHF or UHF handheld or even mobile mounted remote transceiver being remote from a location A is in communication with a respective VHF or UHF transceiver at location A. The cross-patch circuit is interfaced between the VHF or UHF transceiver and an HF transceiver at location A passes on received signals to, in this case an HF transceiver at location B. This then allows the HF transceiver at location B also cross-patched to a VHF or UHF transceiver to transmit to a remote VHF or UHF transceiver. This particular arrangement allows two users remote from locations A and B respectively to exchange messages even when location A and B are a great distance apart but within HF communications range.

Figure 7:
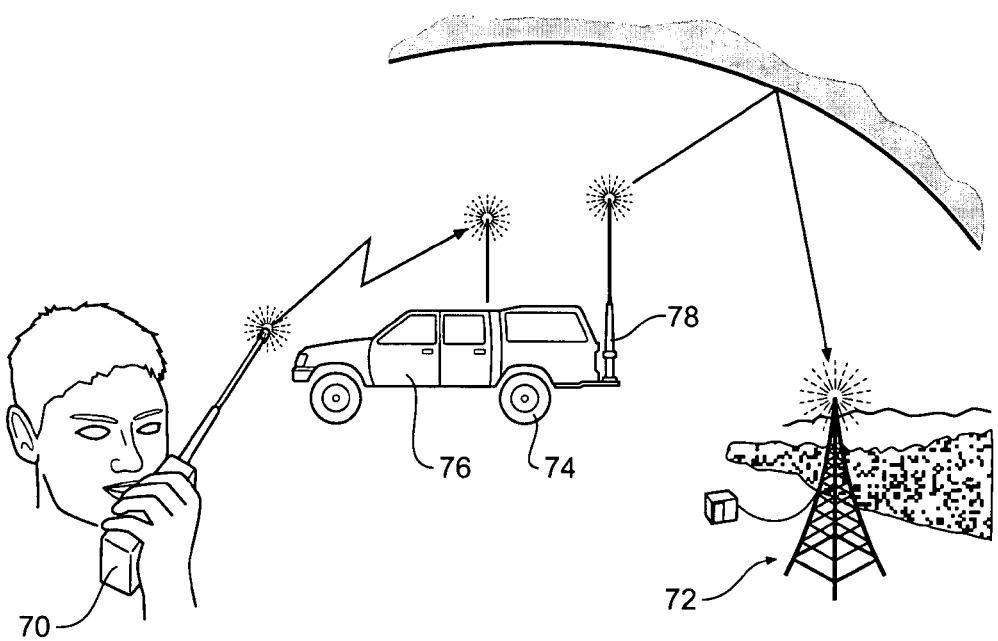
FIG. 7 depicts a VHF/UHF handheld radio to HF base station communication controlled by the handheld radio user using signalling from the keypad of the handheld radio.

FIG. 7 depicts a VHF/UHF handheld radio 70 to HF base station 72 communication arrangements. The vehicle-mounted cross-band system 74 receives VHF/UHF signals 76 and repeats the received audio and control signals through the vehicle-mounted HF transmitter 78. The handheld radio user using signalling from the keypad of the handheld radio can control various features of the vehicle-mounted HF transceiver. Clearly, the vehicle can be many hundreds or thousands of kilometers from the land based HF station and the VHF/UHF handheld user can be kilometers from the vehicle.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications in its scope.

The claims defining the invention are as follows:

1. A method of operation of a cross-band simplex radio frequency communications system including, a first band receiver on a first radio frequency band for receiving and demodulating a first received signal, a second band transmitter using a second radio frequency band to modulate and transmit the demodulated first received signal when in a cross band mode, and a second band receiver using the second radio frequency band, the method including the steps of:

detecting the occurrence of a predetermined condition associated with the first received signal in the first band receiver;

replacing transmission of the demodulated signal received on the first band receiver with a breakthrough signal for a first predetermined time;

ceasing transmission from the second band transmitter; and receiving on the second band receiver for a second predetermined time and determining if a signal is received on the second band receiver and if so allowing remote operation of the first band receiver of the single frequency simplex communications system.

2. A method of operation of a cross-band simplex radio frequency communications system according to claim 1, the system further including a first band transmitter on a first radio frequency band, the method further including the step of:

detecting the reception by the second band receiver of a predetermined signal to control the operation of both the first radio frequency radio receiver and/or transmitter to allow the further operation of the cross-band single frequency simplex communications system regardless of the occurrence of a predetermined condition associated with the first received signal in the first band receiver.

3. A method of operation of a cross-band simplex radio frequency communications system according to claim 1 further including a command interface for generating messages indicating mode changes in the first band receiver or associated first band transmitter and further a cross-patch circuit for transferring demodulated signals to and from the first band radio frequency receiver and transmitter from and to the second band radio frequency transmitter and receiver respectively, the method including the further step of:

determining the operating mode of the first band receiver and/or transmitter by monitoring the command interface, and a) if the command interface indicates an "Off" mode, continue to monitor the command interface for messages indicating mode changes and no cross patching occurs;

b) if the command interface indicates a "Standby" mode, continue monitoring the first receiver for incoming signal, and 1) when there is an incoming signal operate the cross-patch circuit to generate a tone that is transmitted on the second band transmitter and if the cross-patch circuit detects a response via the second band receiver, demodulated signals received on the first band radio frequency receiver are patched to the second band transmitter for the duration of the incoming signal;

c) if the command interface indicates an "Active" mode, the cross-patch circuit monitors the command interface and if the first band receiver is on-channel or has received a call, any received and demodulated audio is patched to and from the second band receiver and transmitter.

4. A method of operation of a cross-band simplex radio frequency communications system according to claim 3 including the further step of;

monitoring using the cross-patch circuit the demodulated signal received on the second band receiver for DTMF commands;

decoding and sending DTMF commands to the command interface using the cross-patch circuit.

5. A method of operation of a cross-band simplex radio frequency communications system according to claim 4 including the further step of;

signaling for transmission by the second band transmitter the progress of a DTMF commands sent to the command interface using a predetermined audible signal indicative of the effect an earlier sent DTMF tone has had on the first band receiver and/or transmitter.

6. A control element for a cross-band simplex radio frequency communications system, the system including, a first receiver on a first radio frequency band for receiving and demodulating a first received signal, a transmitter using a second radio frequency band to modulate and transmit the demodulated first received signal, and a second radio frequency receiver using the second radio frequency band, the control element including:

a detection arrangement for detecting the occurrence of a predetermined failure condition associated with the demodulated first received signal;

a control arrangement triggered by the detection arrangement for replacing transmission of the first demodulated received signal with a breakthrough signal for a first predetermined time; and receiving on the second radio frequency receiver for a second predetermined time and determining if a signal is received on the second radio frequency receiver and then allowing the further operation of the cross-band single frequency simplex communications system.

\* \* \* \* \*